United States Patent [19]

Mima et al.

[11] 4,120,589
[45] Oct. 17, 1978

[54] METHOD AND APPARATUS FOR MEASURING THE DISTRIBUTION OF A LIGHT FIELD ABOUT THE OPTICAL AXIS OF A LIGHT SOURCE

[75] Inventors: Yoshitada Mima, Tachikawa; Naoaki Kubushiro, Komae; Koji Kojima, Kawasaki, all of Japan

[73] Assignees: Hitachi Denshi Kabushiki Kaisha; Kabushiki Kaisha Banzai, both of Japan

[21] Appl. No.: 795,532

[22] Filed: May 10, 1977

[30] Foreign Application Priority Data
Jul. 2, 1976 [JP] Japan .................. 51/77726

[51] Int. Cl.² .............................................. G01J 1/00
[52] U.S. Cl. ......................................... 356/121; 358/96
[58] Field of Search ................... 356/121, 122; 358/96

[56] References Cited
FOREIGN PATENT DOCUMENTS
19,355/68  8/1968  Japan .......................................... 356/121

OTHER PUBLICATIONS

Bruder, J.A. "Instrumentation for Mapping Light Intensity Contours", *IEEE Transactions on Vehicular Technology*, vol. VT-19, No. 3, Aug. 1970.

*Primary Examiner*—John K. Corbin
*Assistant Examiner*—R. A. Rosenberger
*Attorney, Agent, or Firm*—Charles W. Helzer

[57] ABSTRACT

A video signal produced by picking up the light image of light projected upon a screen is quantized by a plurality of voltage comparators grouped in pairs and applied with different reference voltage levels. One of the outputs of comparators of respective pairs is inverted in an orderly manner and then synthesized with the rest of the outputs to produce a dark and bright stripe signal which is displayed on a video display device to form a radially discrete annular pattern representative of equibrightness curves.

9 Claims, 31 Drawing Figures

METHOD AND APPARATUS FOR MEASURING THE DISTRIBUTION OF A LIGHT FIELD ABOUT THE OPTICAL AXIS OF A LIGHT SOURCE

BACKGROUND OF THE INVENTION

This invention relates to a method and apparatus for measuring the distribution of light field about the optical axis of a light source such as a light projector and a motor car headlight, and more particularly to a method and apparatus for measuring the distribution of light field about the optical axis capable of readily adjusting the optical axis of a headlight of a motor car with high accuracies.

As will be described later with reference to the accompanying drawings, a prior art method of testing and adjusting the optical axis of a motor car headlight, for example, comprises the steps of disposing light receiving elements at the center and on the circumference of a circle drawn on a flat plate at an angular spacing of 90°, aligning a light emitting portion of the headlight which is disposed to face the flat plate with the center of the circle, illuminating the flat plate with a light beam from the headlight, coarsely adjusting the vertical projection angle and the horizontal projection angle of the light beam such that the respective light receiving elements will receive the same amount of the incident light, and then finely adjusting the vertical projection angle and the horizontal projection angle such that the light receiving element at the center of the circle will receive the maximum amount of the incident light. With this method, however, the distribution of the amount of the incident light upon the flat plate from the headlight should be symmetrical with respect to the center of the circle not only in the vertical direction but also in the horizontal direction. If the distribution of the amount of the light were asymmetrical with respect to the center, measurment errors would result.

Also, as will be described later, another prior art method of testing and adjusting the optical axis of a headlight comprises the steps of projecting the light of the headlight upon an irregularly reflecting screen, picking up an image of the projected light on the screen by means of a video camera, processing the output video signal from the video camera so as to produce pulses at the transition point of maximum brightness on the screen and the transition points on respective equibrightness curve, thereby to display border lines on a video monitor. According to this method, the light distribution on the screen can be displayed continuously if the tone of a monitor picture varies within a short time in the horizontal direction, but it is impossible to judge the continuity of the equibrightness curve if the time of variation in the brightness is long in the horizontal direction.

SUMMARY OF THE INVENTION

Accordingly, it is an object of this invention to provide an improved method and apparatus for measuring the distribution of light field about the optical axis of a light source capable of measuring and displaying the light distribution of a complicated pattern with high fidelity.

Another object of this invention is to provide an improved method and apparatus for measuring the light distribution about the optical axis of a light source capable of varying the brightness of the equibrightness curves in accordance with the light distribution.

According to one aspect of this invention, there is provided a method of measuring the distribution of light field about the optical axis of a light source comprising the steps of generating a video signal by picking up the light of the light source projected upon a screen, quantizing the video signal by means of a plurality of pairs of voltage comparators, each pair including voltage comparators set with different reference voltage levels, inverting one of the outputs of the voltage comparators of respective pairs in an orderly manner, synthesizing the one of the outputs of the respective pairs with the rest of the outputs thereof thus forming a dark and bright stripe signal, and displaying the stripe signal on a video display unit for producing a radially discrete annular pattern representative of equibrightness curves of the light distribution.

According to another aspect of this invention there is provided apparatus for measuring the distribution of light field about the optical axis of a light source comprising a light surce, a screen upon which the light from the light cource is projected, a video camera for picking up the light image on the screen for producing a video signal, a plurality of voltage comparators each having two inputs and being grouped into pairs, means for applying the video signal to one input of respective voltage comparators, means for applying different reference voltage levels to the other input of respective voltage comparators, means for inverting one of the outputs of voltage comparators of respective pairs in an orderly manner, a logical circuit arrangement for processing the noninverted outputs and the inverted outputs from respective voltage comparator pairs, and a video display unit for displaying the output of the logical circuit arrangement.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
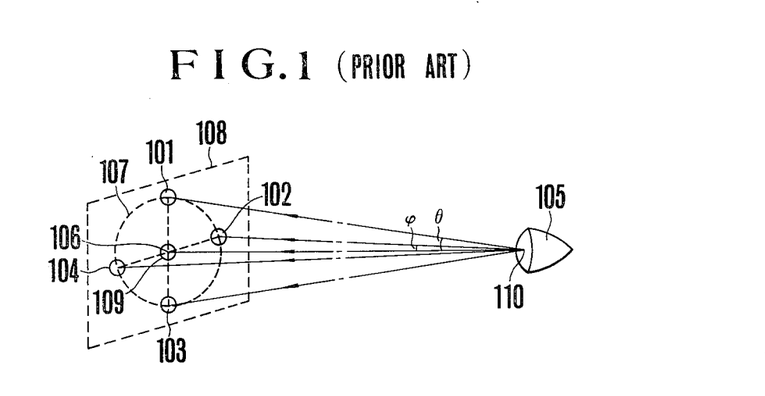
FIG. 1 is a diagrammatic representation of a prior art apparatus for measuring and adjusting the distribution of light field about the optical axis of a headlight.

As diagrammatically shown in FIG. 1, in a prior art apparatus for measuring and adjusting the distribution of light field about the optical axis of a light projector 105, for example, a motor car headlight, light receiving elements 101, 102, 103 and 104 (solar cells, photodiodes, phototransistors, etc.) are disposed at the center 106 of a circle 107 drawn on a flat plate 108 and at points on the circle at an angular spacing of 90° and the light projector 105 is disposed to face the flat plate 108. At first the light emitting portion 110 of the light projector such as headlight is aligned with the center of the circle 107 and the light beam is projected upon various light receiving elements. At this time, the vertical projection angle $\theta$ or the horizontal projection angle $\phi$ are coarsely adjusted such that the amount of the light incident upon respective light receiving elements will be equal. Then the vertical projection angle $\theta$ or the horizontal projection angle $\phi$ or both are finely adjusted so that the amount of the light incident upon the center light receiving element 109 will be the maximum, thus adjusting the optical axis of the projector. According to this apparatus, it is essential that the distribution of the light incident upon the flat plate 108 from the light projector 105 should be symmetrical not only in the vertical direction but also in the horizontal direction with respect to the center 106. Otherwise, measurment errors would result.

Figure 2:
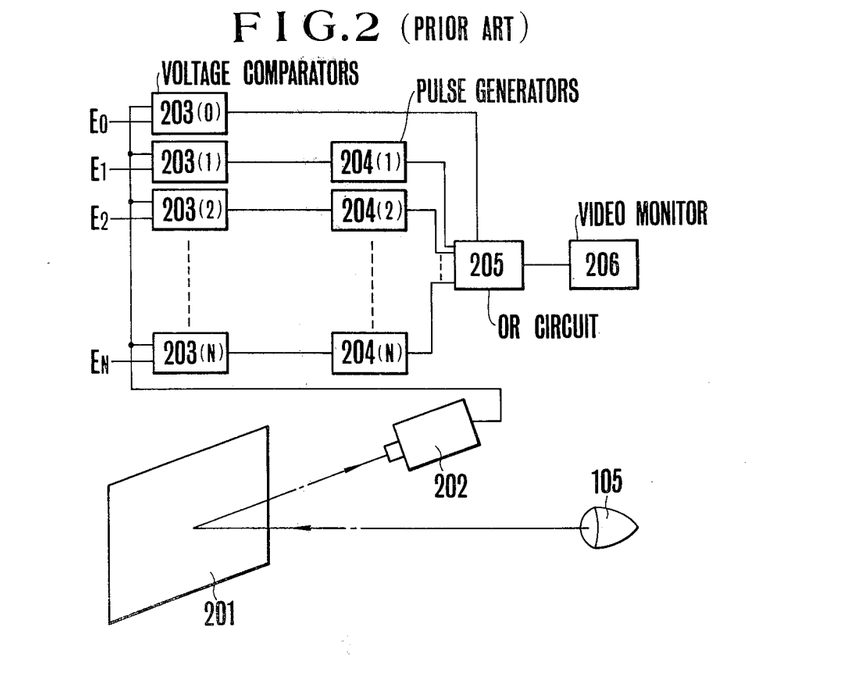
FIG. 2 is a block diagram showing another prior art apparatus for measuring and adjusting light distribution about the optical axis of a headlight.

As shown in FIG. 2, according to another prior art apparatus, the light from a light projector 105 is projected upon an irregularly reflecting screen 201 and the image of the projector 105 formed on the screen 201 is picked up by a video camera. The waveform of the video output signal from the video camera is processed by waveform processors 203, 204 and 205 so as to produce pulses at the transition point of the maximum brightness on the screen and at the transition points of the respective equibrightness curves thereby displaying boarder lines on a video monitor 206.

Figure 3:
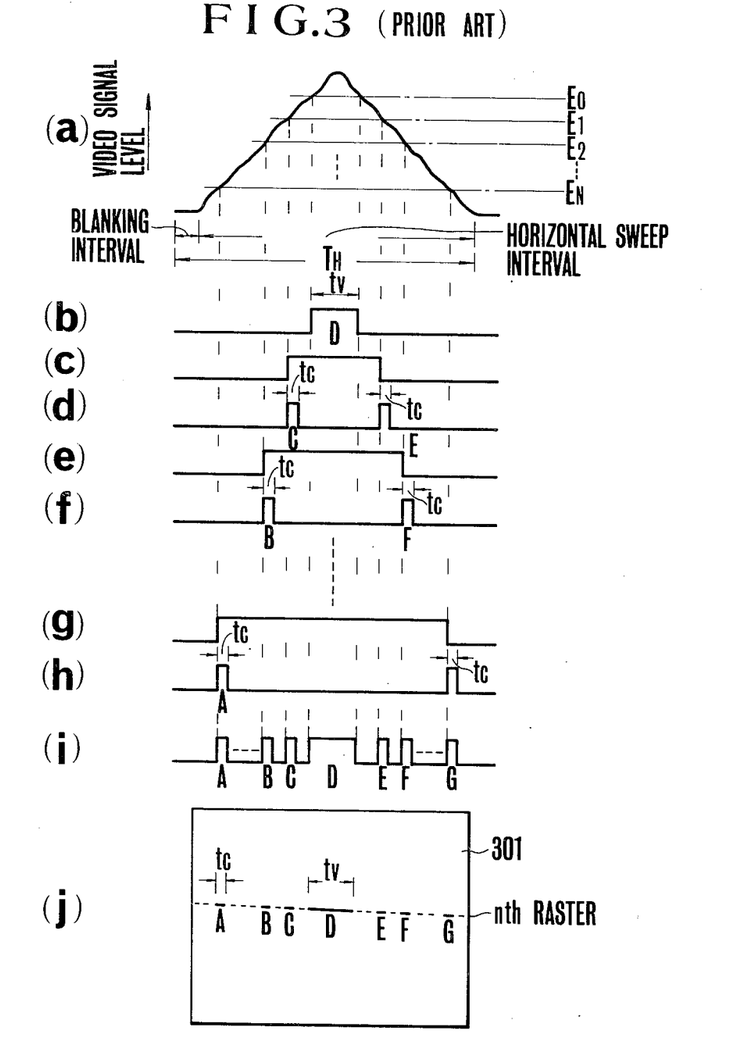
FIGS. 3a through 3j and 4a through 4d are diagrammatic representations of waveform helpful to explain the operation of various elements shown in FIG. 2.

FIGS. 3a through 3j show the manner of processing waveforms of this prior art apparatus. More particularly, FIG. 3a shows one example of the waveform of the output video signal from the video camera 202, FIG. 3b the waveform of the output from a voltage comparator 203(0), FIG. 3c that of the output from a voltage comparator 203(1), FIG. 3d that of the output of a pulse generator 204(1), FIG. 3e that of the output of a voltage comparator 203(2), FIG. 3f that of the output of a pulse generator 204(2), FIG. 3g that of the output of a voltage comparator 203(N), FIG. 3h that of the output of a pulse generator 204(N), FIG. 3i that of the output of an OR circuit 205 and FIG. 3j shows a typical manner of waveform processing performed in connection with the nth raster of a video picture 301 during a horizontal scanning interval $T_H$ which corresponds to the sum of the blanking interval and the horizontal sweeping interval. The signal shown in FIG. 3a is obtained by depicting the distribution of the video signal level corresponding to the light distribution of the light projector 105 in the direction of the horizontal sweeping of the video monitor. If it is supposed now that there is a similar light distribution in the direction of the vertical sweeping, a three dimensional light distribution would be a circular cone having the bottom center at substantially the center of the video picture 301. Accordingly, the nth raster including the scanning line segment D corresponding to the point of the maximum brightness of the light distribution will run at about the center of the video picture as shown in FIG. 3j.

When DC voltages $E_0$, $E_1$, $E_2$ . . . $E_N$ generated at different levels of the video signal produced by the video camera 202 are applied to voltage comparators 203(0), 203(1) . . . 203(N), these comparators produce output waveforms shown in FIG. 3b, FIG. 3c, FIG. 3e . . . FIG. 3g, respectively, These waveforms except the waveform of FIG. 3b are applied to pulse generators 204(1), 204(2) . . . 204(N), respectively, for producing pulses having a width $t_c$ at the rise and fall points of respective waveforms. Consequently, the pulse generator 204(1) produces a waveform shown in FIG. 3d corresponding to the input waveform shown in FIG. 3c, and the pulse generator 204(2) produces a waveform shown in FIG. 3f corresponding to the input waveform shown in FIG. 3e. In the same manner, the pulse generator 204(N) produces an output waveform shown in FIG. 3h corresponding to the input waveform shown in FIG. 3g. The OR circuit 205 produces an output waveform as shown in FIG. 3i corresponding to the sum of the outputs from the voltage comparator 203(0) and respective pulse generators 204(1), 204(2) . . . 204(N). When the waveform shown in FIG. 3i is displayed by a video monitor 206, as shown in FIG. 3j, the image of the nth raster of the video picture 301 will comprise dark segmental lines corresponding to dotted lines, bright segmental dots corresponding to pulses A, B, C, E, F and G generated at the rise and fall of the outputs from respective voltage comparators 203(1) through 203(N), each of which pulses has a definite width $t_c$, and a bright segmental line corresponding to the output D from the voltage comparator 203(0) and having an indefinite pulse width $t_r$. When all raster lines of the video picture are processed in the same manner as above described, display of the equibrightness curves and the maximum brightness point of the image of the projector projected on the screen can be quantized as shown at 503 in FIG. 5.

Figure 4:
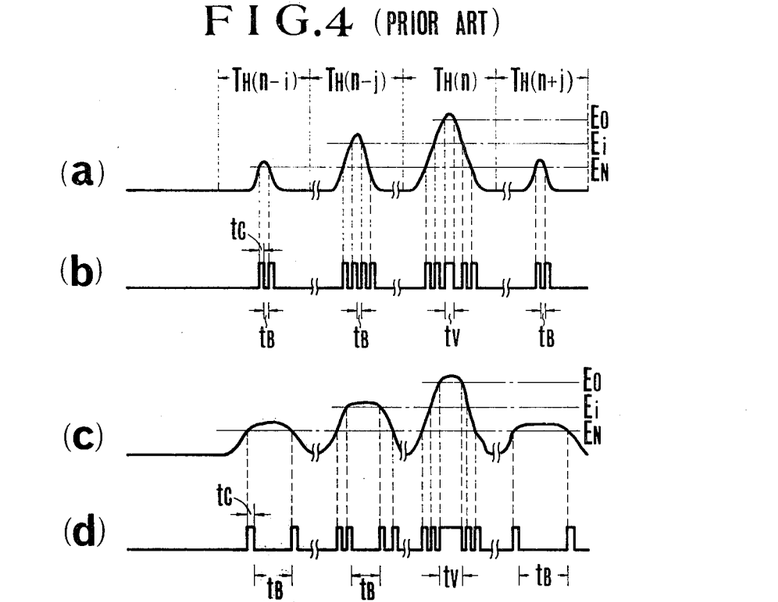
Figure 5:
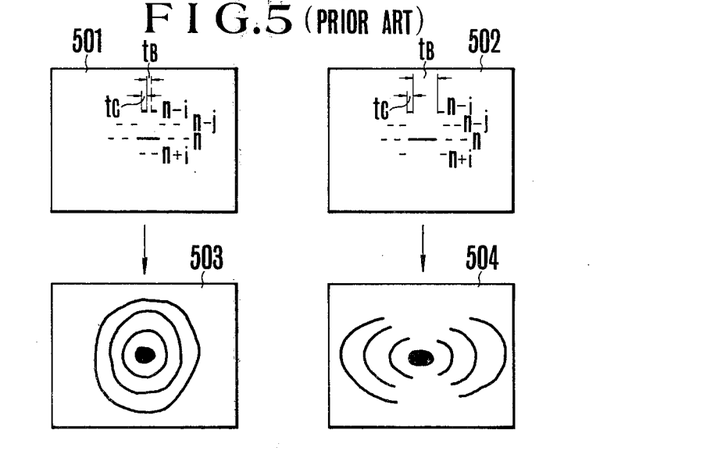
FIG. 5 is a diagram for explaining certain defects of the prior art apparatus shown in FIG. 2.

According to the prior art method, where the waveform of the video output from the video camera 202 has a rapid peak as shown in FIG. 4a, the output of the OR circuit 205 has a waveform as shown in FIG. 4b so as to produce a video picture on the video monitor 206 as shown at 501 in FIG. 5. Since the pulse width $t_B$ is shorter than $t_c$, the display is natural.

It will be appreciated that in FIG. 4a the abscissa represents the time, the ordinate the video signal level, $T_H(n-i)$, $T_H(n-j)$, $T_H(n)$, $T_H(n+i)$, $i$, $j$ and $n$ being integers, shown the horizontal scanning intervals of the $(n-i)$th, $(n-j)$th, nth and $(n+i)$th rasters, respectively. The brightness modulation lines $n-i$, $n-j$, $n$, $n+i$ are displayed on the video picture 301 as shown at 501 in FIG. 5 corresponding to the horizontal scanning intervals of respective rasters shown in FIG. 4a. In FIG. 4b, the low levels correspond to the dark or black portions of the video picture, and the high levels to bright or white portions. The same is true for FIGS. 4c and 4d.

When the peaks of the waveform of the video output from the video camera 202 are not so sharp as shown in FIG. 4c, the waveform of the output from the OR circuit 205 is shown by FIG. 4d and a dark and bright stripe signal pattern as shown at 502 in FIG. 5 is displayed on the video monitor 206. Since the width of the pulses generated by the pulse generators 204(1) through 204(N) is constant, the interval $t_B$ spreads extensively with the result that a picture as shown at 504 in FIG. 5 is produced thus failing to display the light distribution of the light projector with high fidelity.

Although the above consideration was made for only four rasters, i.e., $(n-i)$th, $(n-j)$th, nth and $(n+i)$th lines, with all rasters considered, if the brightness changing time interpreting the light distribution on the screen 201 is short in the horizontal direction of the video picture and, to the extremity, equibrightness curves remain unchanged in the vertical direction, the equibrightness curves may be displayed as continuous curves as shown at 503 in FIG. 5. However, if the brightness changing time interpreting the light distribution on the screen 201 is long in the horizontal direction of the video picture and, to the extremity, equibrightness curves remain unchanged in the horizontal direction, the equibrightness curves may be displayed as shown at 504 in FIG. 5 in which case it is difficult to judge the continuity of the equibrightness curves. Where the light distribution is symmetrical, it is possible to carry out an interpolation into the discontinuous portions but a complicated light distribution of asymmetry prevents any interpolation, thus rendering it impossible to analyze the equibrightness curves.

Figure 6:
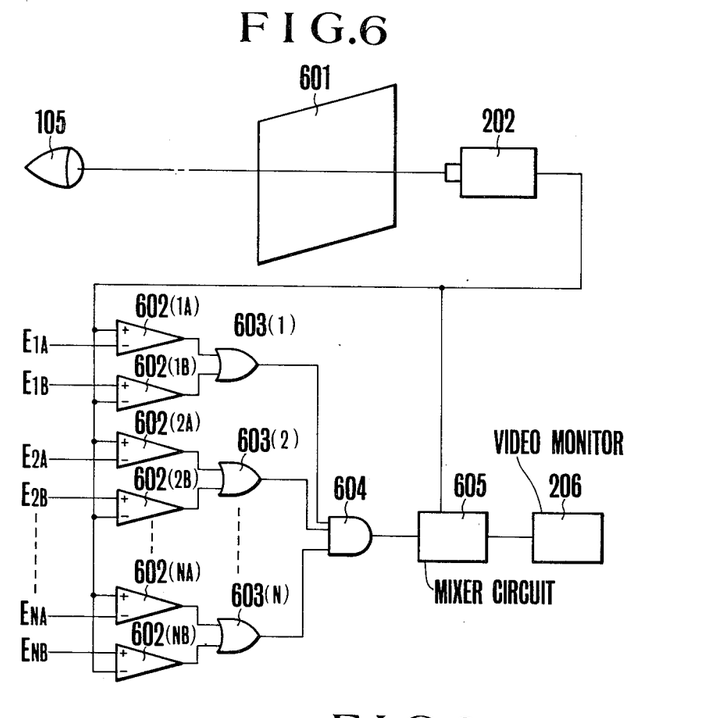
FIG. 6 is a block diagram showing one embodiment of this invention.

Turning now to FIG. 6 showing one embodiment of this invention, 105 designates a headlight, 601 a screen, preferably of the type that diffuses and transmits white color, 202 a video camera, 602(1A), 602(1B), 602(2A), 602(2B) ... 602(NA), 602(NB) voltage comparators, 603(1), 603(2) ... 603(n) OR circuits, 604 an AND circuit, 605 a video signal mixer circuit, and 206 a video monitor.

In operation, the light field from the headlight 105 is projected upon the screen 601 and a light image formed on the screen 601 and transmitting therethrough is picked up by the video camera 202. A video signal produced by the video camera through photoelectric conversion is applied to the positive input terminals of the voltage comparators 602(1A), 602(2A) ... 602(NA) and to the negative input terminals of the voltage comparator 602(1B), 602(2B) ... 602(NB). The output signals of the voltage comparators 602(1A) and 602(1B) are ORed in the OR circuit 603(1). In the same manner, the output signals of the voltage comparators 602(2A) and 602(2B), and 602(NA) and 602(NB) are ORed in OR circuits 603(2) and 603(N), respectively, and the outputs of the OR circuits 603(1), 603(2) ... 603(N) are ANDed in the AND circuit 604. The mixer circuit 605 changes the level of the output signal from the AND circuit 604 and superposes the video signal from the video camera 202 upon the level changed signal. The output of the mixer circuit is applied to the video monitor 206 for the purpose of supervision. Since many types of the mixer circuit and voltage comparators are well known in the art, detailed description thereof is believed unnecessary.

Figure 7:
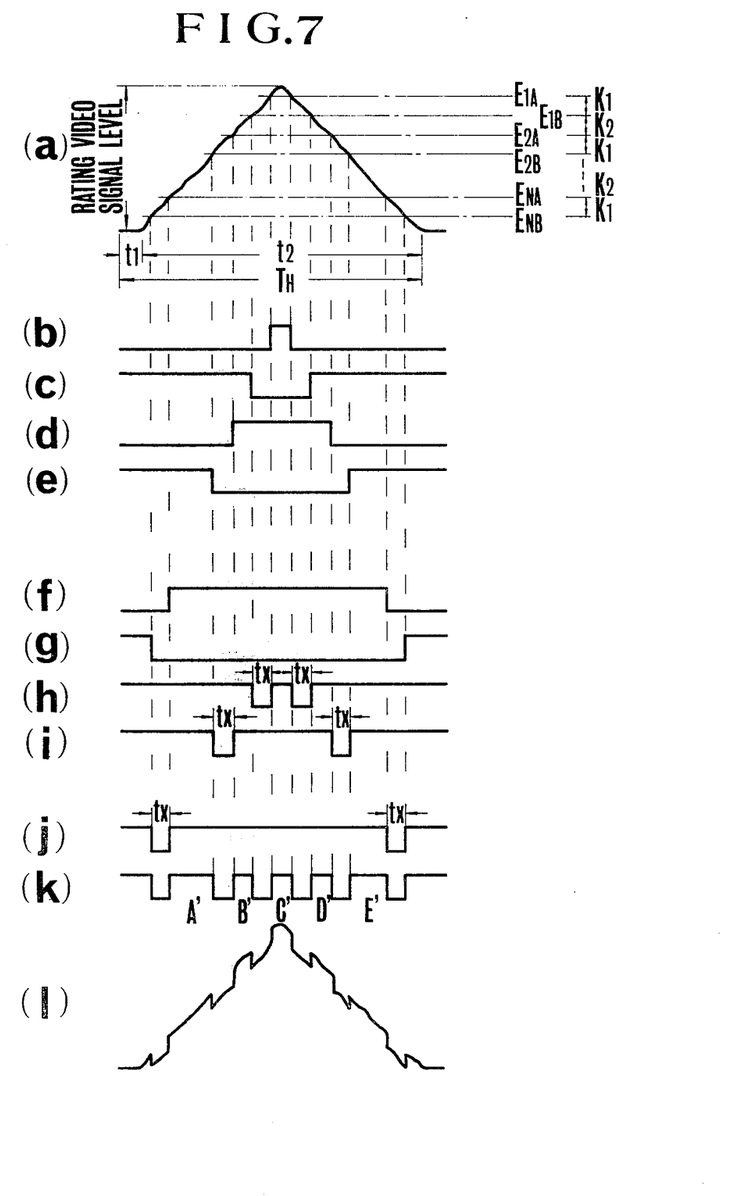
FIGS. 7a through 7l are waveforms helpful to explain the operation of various elements shown in FIG. 6.
Figure 8:
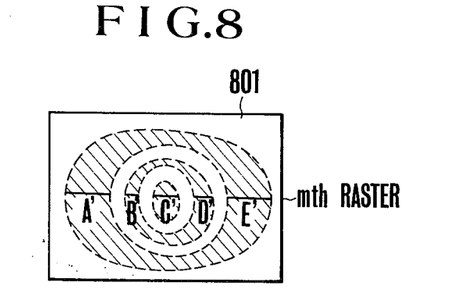
FIG. 8 is a diagram showing a video picture useful to demonstrate the function of this invention.

Referring to FIGS. 7a to 7l, a timing chart is depicted showing the manner of processing a video signal for a video picture as shown at 801 in FIG. 8 in conjunction with mth raster having scanning interval of $T_H$. FIG. 7a shows the waveform of the video signal produced by the video camera 202, FIG. 7b the output waveform of the voltage comparator 602(1A), FIG. 7c the output waveform of the voltage comparator 602(1B), FIG. 7d the output waveform of the voltage comparator 602(2A), FIG. 7e the output waveform of the voltage comparator 602(2B), FIG. 7f the output waveform of the voltage comparator 602(NA), FIG. 7g the output waveform of the voltage comparator 602(NB), FIG. 7h the output waveform of the OR circuit 603(1), FIG. 7i the output waveform of the OR circuit 603(2), FIG. 7j the output waveform of the OR circuit 603(N), FIG. 7k the output waveform of the AND circuit 604 and FIG. 7l the output waveform of the mixer circuit 605. Reference DC voltages $E_{1A}$, $E_{1B}$, $E_{2A}$, $E_{2B}$ ... $E_{NA}$ and $E_{NB}$ which discriminate the levels $E_{1A}$, $E_{1B}$, $E_{2A}$, $E_{2B}$ ... $E_{NA}$, $E_{NB}$ of the video signal shown in FIG. 7a are applied to the voltage comparators 602(1A), 602(1B), 602(2A), 602(2B) ... 602(NA) and 602(NB), respectively, from a suitable constant voltage source. When the reference DC voltages are selected to satisfy the following relationships $E_{1A}-E_{1B} = E_{2A}-E_{2B} = \ldots = E_{NA}-E_{NB} = K_1$ and $E_{2A}-E_{1B} = E_{3A}-E_{2B} = \ldots = E_{NA}-E_{(N-1)B} = K_2$, the outputs of respective comparators are shown by FIGS. 7b through 7g as described above.

When the outputs shown in FIGS. 7b and 7c are ORed by the OR circuit 603(1), an output as shown in FIG. 7h is produced. In the same manner, the OR circuit 603(2) produces an output as shown in FIG. 7i when the outputs shown in FIGS. 7d and 7e are ORed, and the OR circuit 603(N) produces an output as shown in FIG. 7j when the outputs shown in FIGS. 7f and 7g are ORed. Further, the AND circuit 604 produces an output shown in FIG. 7k when the outputs of the OR circuits 603(1), 603(2) ... 603(N) are ANDed. When the output of the AND circuit 604 is displayed directly by the video monitor 206 without passing through the mixer circuit 605, the mth raster (running substantially past the center of the picture) of the video picture 801 shown in FIG. 8 is displayed such that the scanning line segments which are subjected to a brightness modulation in accordance with the high levels A', B', C', D' and E' of the waveform shown in FIG. 7k are white and the spaces between these segments are black. Accordingly, when a video signal at a rating level is produced, a radially discrete annular pattern of black and white stripes is produced having the same number of annuli as the pairs of the voltage comparators. On the other hand, when the level of the output shown in FIG. 7k is changed by the mixer circuit 605 and then mixed with the video signal shown in FIG. 7a, a composite signal as shown in FIG. 7l is obtained. When this composite signal is displayed on the video monitor 206, the image of the mth raster of the video picture 801 shown in FIG. 8 corresponds to the waveform shown in FIG. 7l so that the scanning line segments A', B', C', D' and E' are displayed bright in such a manner that the central segment C' has the highest brightness, that the brightness decreases toward segments B', A' and D', E' and that the spaces between both of these segments are dark. In other words, the video monitor 206 displays not only the light distribution of the headlight but also the level of the equibrightness curves.

While the foregoing description refers to the mth raster of the video picture 801, when the same principle is applied to all of the rasters, the hatched areas of the video picture 801 shown in FIG. 8 are displayed bright and the other areas dark corresponding to the image projected on the screen 601 thus displaying a radially discrete annular pattern representative of equibrightness curves on the video monitor 206.

In the embodiment shown in FIG. 6, when quantizing the video signal level by using N voltage comparators, adjacent voltage comparators 602(1A) and 602(1B), 602(2A) and 602(2B), ... and 602(NA) and 602(NB) are paired and then the output video signal of the video camera 202 is supplied across the positive input terminals of the first voltage comparators 602(1A), 602(2A) ... 602(NA) and across the negative input terminals of the second voltage comparators 602(1B), 602(2B) ... 602(NB) whereas the reference voltages are applied with a opposite phase relationship so as to reverse the polarity of the adjacent voltage comparators of each pair in an orderly manner, that is, the polarity of the output of the first comparator of each pair is positive and that of the second comparator of the pair is negative. However, it should be understood that the method of inverting one of the outputs from respective comparator pairs is not limited to the specific method described above.

Figure 9:
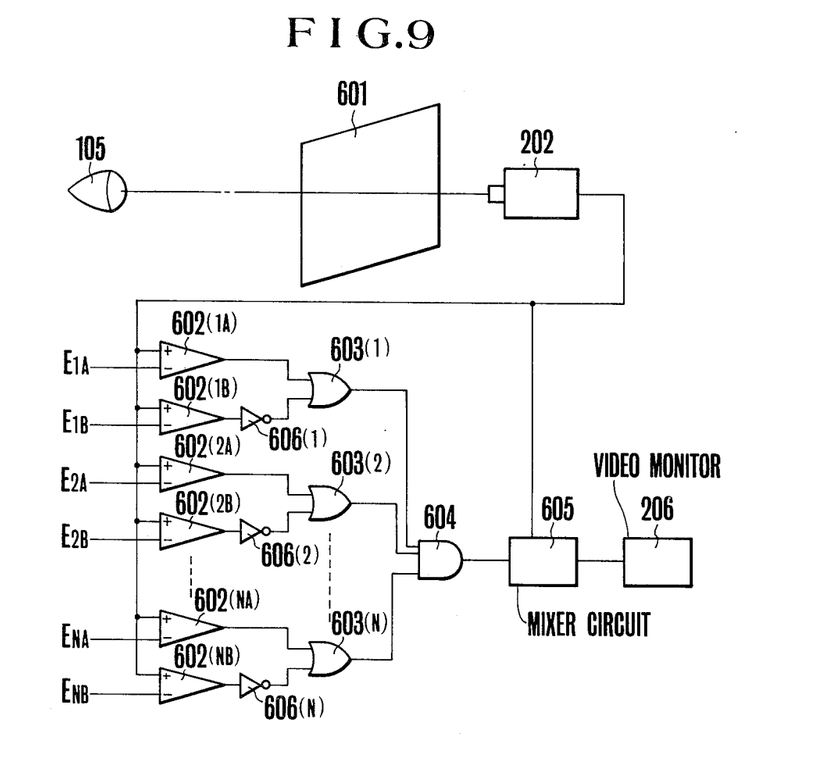
FIG. 9 is a block diagram showing another embodiment of this invention.

FIG. 9 illustrates another embodiment of this invention in which elements corresponding to those shown in FIG. 6 are designated by the same reference characters. In this embodiment, the output video signal from the video camera 202 is supplied to the positive input terminals of all voltage comparators 602(1A), 602(1B), 602(2A), 602(2B) . . . 602(NA) and 602(NB) and the reference DC voltages $E_{1A}$, $E_{1B}$, $E_{2A}$, $E_{2B}$ . . . $E_{NA}$ and $E_{BN}$ are applied to the negative input terminals of these voltage comparators. Inverters 606(1), 606(2) . . . 606(N) are connected on the output side of the second voltage comparators 602(1B), 602(2B) . . . 602(NB) of respective comparator pairs. In this embodiment too, the polarity of the output signal from adjacent voltage comparators of each pair is reversed in an orderly manner.

In both embodiments shown in FIGS. 6 and 9, when the level differences $K_1$ and $K_2$ of the reference voltages applied to respective voltage comparators are equal, it is possible to make equal the quantized levels for the white and black segments of the radially discrete annular pattern of equibrightness curves. Where $K_2 \neq K_1$, it is possible to vary the quantized levels for the white and black segments at any desired ratio. If $K_2$ were made larger, the width of the white segments increases, whereas when $K_1$ is made larger the width of the black segment increases. Accordingly, when the ratio between the width of the white and black segments is made about 1:10 by varying the ratio between $K_2$ and $K_1$, it is possible to produce a radially discrete annular pattern representing equibrightness curves suitable for observation with naked eyes.

Further, it should be understood that the embodiment of FIG. 6 may be modified such that the outputs of voltage comparators 602(1B) and 602(2A), 602(2B) and 602(3A), . . . , and 602[(N−1)B] and 602(NA) in combination are first ANDed and thereafter resultant outputs and the outputs from voltage comparators 602(1A) and 602(NB) are ORed, thereby obtaining a radially discrete annular pattern. Obviously, it is also possible to analogly synthesize the inverted outputs of the voltage comparators with the rest of the outputs thereof.

As described above according to this invention, there is provided a method and apparatus for measuring the distribution of the light field about an optical axis of a headlight wherein it is possible to produce a radially discrete annular pattern representative of equibrightness curves not containing any discontinuity. Accordingly, the operator can readily adjust the optical axis and inspect the light distribution.

What is claimed is:

1. A method of measuring the distribution of light field about the optical axis of a light source comprising the steps of generating a video signal by picking up the light of said light source projected upon a screen, quantizing said video signal by means of a plurality of pairs of voltage comparators, each pair including voltage comparators set with different reference voltage levels, inverting one of the outputs of the voltage comparators of respective pairs in an orderly manner, synthesizing the one of the outputs of the respective pairs with the rest of the outputs thereof thus forming a dark and bright stripe signal, and displaying said stripe signal on a video display unit for producing a radially discrete annular pattern representative of equibrightness curves of the light distribution.

2. The method according to claim 1 wherein said reference voltage levels applied to said voltage comparators are selected to satisfy the following relationships, $E_{1A} - E_{1B} = E_{2A} - E_{2B} = \ldots = E_{NA} - E_{NB} = K_1$ and $E_{2A} - E_{1B} = E_{3A} - E_{2B} = \ldots E_{NA} - E_{(N-1)B} = K_2$ where $E_{1A}$, $E_{2A}$, $E_{3A}$ . . . $E_{NA}$ represent the reference voltage levels of one voltage comparator of respective pairs and $E_{1B}$, $E_{2B}$, $E_{3B}$ . . . $E_{NB}$ represent the reference voltage levels of the other voltage comparator of respective pairs.

3. The method according to claim 2 wherein $K_2 = K_1$.

4. The method according to claim 2 wherein $K_2 \neq K_1$.

5. Apparatus for measuring the distribution of light field about the optical axis of a light source comprising a light source, a screen upon which the light from said light source is projected, a video camera for picking up the light image on said screen for producing a video signal, a plurality of voltage comparators, each having two inputs and being grouped into pairs, means for applying said video signal to one input of respective voltage comparators, means for applying different reference voltage levels to the outer input of respective voltage comparators, means for inverting one of the outputs of voltage comparators of respective pairs in an orderly manner, a logical circuit arrangement for synthesizing the noninverted output and the inverted output from respective voltage comparator pairs, and a video diplay unit for displaying the output of said logical circuit arrangement.

6. The apparatus according to claim 5 wherein said logical circuit arrangement includes a plurality of OR circuits for passing the noninverted outputs and the inverted outputs from said voltage comparator pairs, and an AND circuit by which the outputs of said OR circuits are ANDed.

7. The apparatus according to claim 5 which further comprises a mixer circuit connected between said logical circuit arrangement and said video display unit for mixing the output from said logical circuit arrangement with said video signal.

8. The apparatus according to claim 5 wherein said polarity inverting means comprises means for supplying said video signal to one input terminal of one voltage comparator of each pair and to the other input terminal of the other voltage comparator of said pair and means for supplying different reference DC voltages to the inputs of said voltage comparator pair in a relation opposite to the relation just mentioned.

9. The apparatus according to claim 5 wherein said polarity inverting means comprises means for applying said video signal to one input of both voltage comparators of respective pairs and means for applying different reference DC voltages to the other input of both voltage comparators of respective pairs, and inverters each connected to the output of one of voltage comparators of respective pairs.

* * * * *